United States Patent [19]

Smith

[11] Patent Number: 5,606,309

[45] Date of Patent: Feb. 25, 1997

[54] ROAD HAZARD WARNING APPARATUS

[76] Inventor: Frank Smith, 553 3/4 Washington Blvd., Venice, Calif. 90291

[21] Appl. No.: 381,645

[22] Filed: Jan. 31, 1995

[51] Int. Cl.$^6$ .................................................. B60Q 7/00

[52] U.S. Cl. .......................... 340/473; 340/908; 362/812; 116/637; 116/638

[58] Field of Search ................................. 340/473, 471, 340/472, 468, 908, 908.1; 362/812, 234, 396; 116/63 T, 63 P

[56] References Cited

U.S. PATENT DOCUMENTS

| | | | |
|---|---|---|---|
| 4,374,376 | 2/1983 | Pillifant, Jr. | 340/473 |
| 4,440,104 | 4/1984 | Bleiweiss et al. | 116/63 T |
| 4,613,847 | 9/1986 | Scolari et al. | 340/473 |
| 4,825,191 | 4/1989 | Ching-Hwei | 340/472 |
| 4,875,028 | 10/1989 | Cleou | 340/473 |
| 4,949,071 | 8/1990 | Hutchinson | 340/473 |
| 5,126,926 | 6/1992 | Wen | 340/472 |
| 5,311,412 | 5/1994 | Yang | 340/472 |
| 5,349,346 | 4/1994 | Wu | 340/471 |

*Primary Examiner*—Jeffery Hofsass
*Assistant Examiner*—Nina Tong
*Attorney, Agent, or Firm*—Matthew F. Jodziewicz

[57] ABSTRACT

A road hazard warning device for use with an electrical system of a vehicle includes a generally triangular, planar member having front and rear sides. A weight is attached to one side of the planar member to cause it to hang generally perpendicular when attached to the vehicle. A plurality of lights are attached adjacent the outer peripheral edges of the planar member. A circuit is connected to the lights for flashing the lights. Electrical power is supplied to the lights from the electrical system of the vehicle by a first and second wire, each having at a first end an electrical connection to each light and at a second end having an allegator clip with tensioned opposed jaw members biased to remain in a closed position. Each jaw member has a plurality of depending teeth adapted for penetrating the insulation surrounding a wire in the vehicle electrical system and creating an electrical connection therewith for providing electrical power to the lights.

17 Claims, 2 Drawing Sheets

5,606,309

ROAD HAZARD WARNING APPARATUS

NOTICE REGARDING COPYRIGHTED MATERIAL

A portion of the disclosure of this patent document contains materials which are subject to copyright protection. The copyright owner has no objection to the facsimile reproduction by anyone of the patent document or the patent disclosure as it appears in the patent and Trademark Office patent file or records, but otherwise reserves all copyright rights whatsoever.

BACKGROUND OF THE INVENTION

1. Field of the Invention

This invention relates in general to automotive road hazard warning and safety devices, and more particularly to a road hazard warning device for use with the electrical system of a vehicle.

2. Background of the Invention

Whenever a vehicle breaks down and poses a road hazard, the motorist is in danger from surrounding vehicles who may not be aware of the difficulty. Accordingly, there are a number of warning signals that are provided the motorist for such occasions. Chief among these are the standard double flashing brake lights or hazard lights required for each vehicle by law.

However, if the problem is occasioned by a failure in the electrical system of the car, or in the flashing circuitry of the hazard lighting system, the motorist may be left without a warning signal for other vehicles.

OBJECTS AND SUMMARY OF THE INVENTION

Accordingly, it is an object of the present invention to provide a road hazard warning device for use with the electrical system of a vehicle that is independent of any other vehicle hazard warning system.

It is still another object of the present invention to provide a road hazard warning device that is capable of being placed by the user in a position on the vehicle deemed to be clearly visible by a fellow motorist.

It is yet another object of the present invention to provide a road hazard warning system that is capable of providing the user with a clearly visible warning system designed to attract the attention of any surrounding vehicle or motorist.

In general, the invention is embodied in a road hazard warning device for use with an electrical system of a vehicle that includes a generally triangular, planar member having a front side and a rear side with a light reflective coating applied to the front side of the planar member. A plurality of lights are mounted on the front side adjacent the outer peripheral edges of the generally triangular, planar member to attract and draw attention to the device from passing motorists. The device also has wires forming a circuit that are connected to the lights and supply electrical power from the electrical system of the vehicle to the lights. The device is releasably held or mounted on the vehicle by a magnetic or adhesive strip attached to the rear side of the planar member.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT

Figure 1:
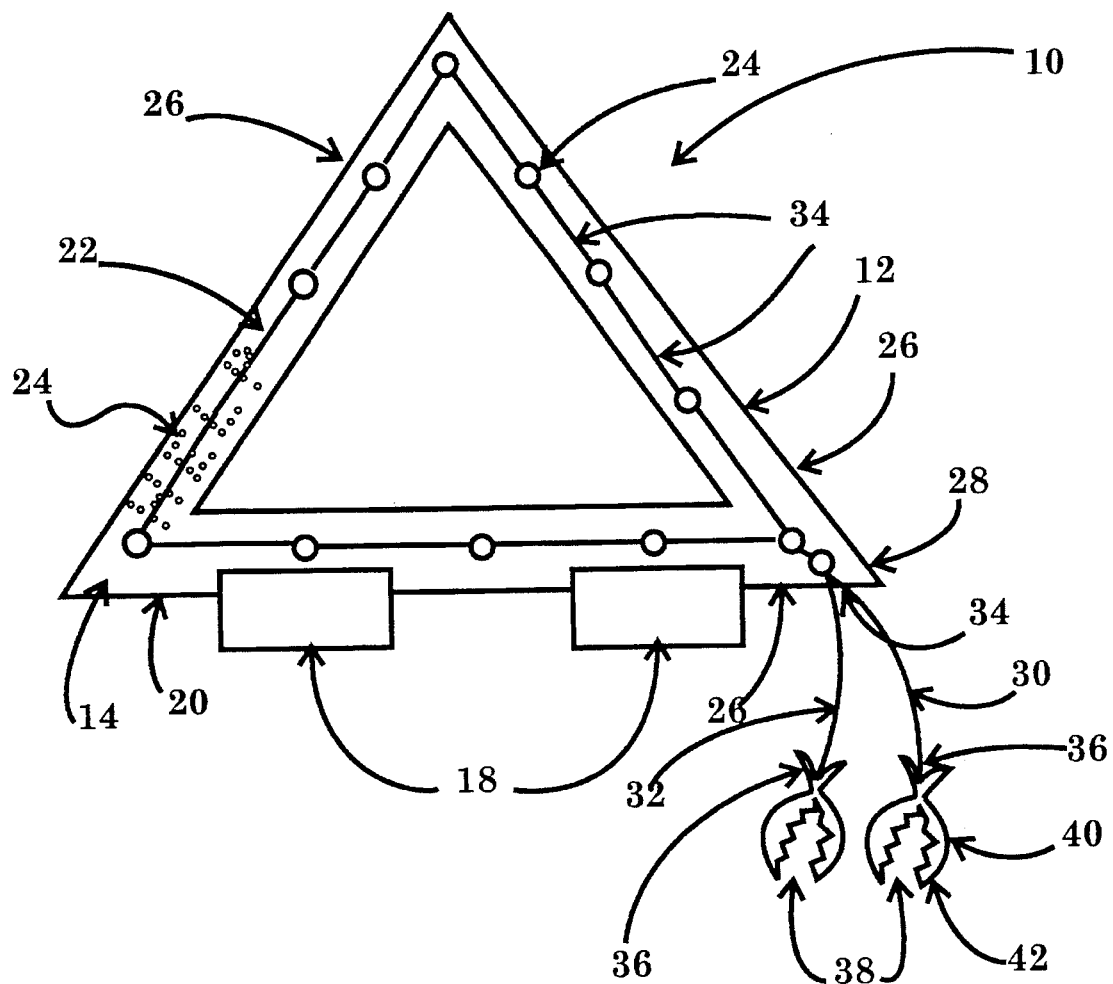
FIG. 1 is a front view of a road hazard warning device that is constructed in accordance with the present invention.
Figure 2:
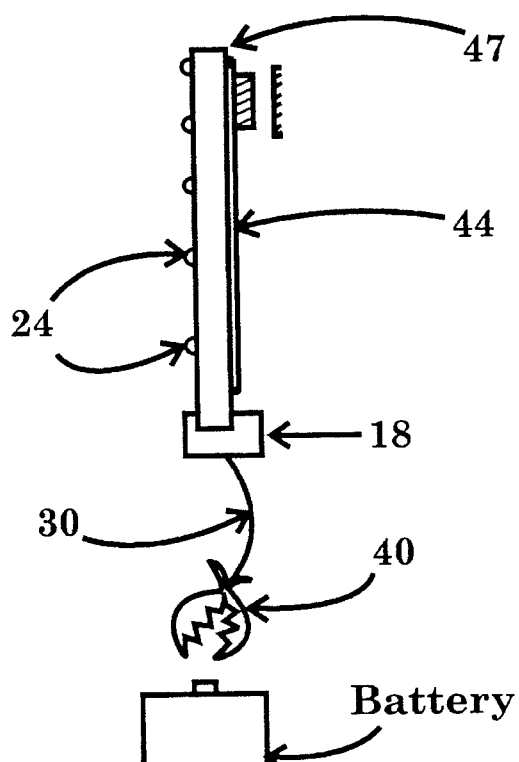
FIG. 2 is a side view of the device of FIG. 1.
Figure 3:
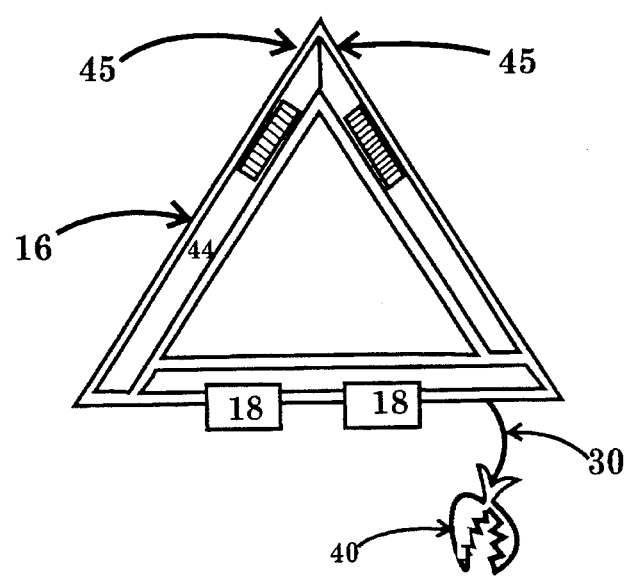
FIG. 3 is a rear view of the device of FIG. 1.

A preferred embodiment of a safety cover embodying the present invention will now be described with reference to drawing FIGS. 1 to 3.

A road hazard warning device for use with an electrical system of a vehicle, is illustrated by reference arrow 10 in FIGS. 1 and 3.

The main body of device 10 comprises a planar member 12 having front side 14 and rear side 16 respectively. Planar member 12 is preferably generally triangular in shape to resemble the generally universally recognized international road symbols gaining motorist familiarity throughout the world. However, planar member 12 may also have any other shape or outline such as spelling out a message with its lights requesting assistance or aid.

A weight 18 is attached to one side 20 of planar member 12 to cause planar member 12 to hang generally perpendicular when attached to the vehicle. Planar member 12 may be fabricated from rigid or flexible materials. For example, planar member 12 may be manufactured from a stiff, thick plastic sheet with the structure described below embedded directly in the sheet during manufacture, or it may be constructed from a flexible sheet of plastic having the described structured adhered to the flexible sheet by known heat treatments or adhesives. In the flexible form, the planar member 12 may be stored as either rolled or folded in the vehicle until use. The weights described below then become particularly useful in holding the device unfolded in a position most likely to maximize its visibility.

Likewise, if planar member 12 is fabricated from a stiff, thick plastic sheet, it may then also contain joined individual planar members that are hinged together to create a smaller folded configuration for ease in storage of the device when not in use.

A light reflective coating 22 is preferably applied at least to the front side 14 of planar member 12. Reflective coating 22 not only reflects lights from potential on-coming vehicles, but will also reflect light from the flashing of the lights as described below.

A plurality of lights 24 are attached adjacent the outer peripheral edges 26 of planar member 12 to attract the attention of motorists and passers-by.

An electronic circuit or device 28 is connected to lights 24, for flashing the lights to further attract attention to the device 10 when deployed by a motorist. Such a preferred circuit may be directly embodied in the lights themselves as is well known in strings of holiday lights.

Electrical power is supplied to lights 24 by a first and second wire 30, 32, respectively. Each wire has at one end 34 an electrical connection to each light 24 and at a second end 36 an allegator clip 38 with tensioned opposed jaw members 40 biased to remain in a closed position. Each jaw member 40 further has a plurality of depending teeth 42 adapted for penetrating the insulation surrounding a wire in the vehicle electrical system and creating an electrical connection therewith for providing electrical power to lights 24.

Electrical power may also be supplied to the plurality of lights by a single wire if the planar member is conductive to provide an electrical ground for the vehicle's electrical system and a single wire connects the positive terminals of the lights to a wire carrying a positive charge in the vehicle's electrical system. This latter method would, of course, depend upon the type of electrical system found in the vehicle in which the device was to find use, but is considered to be within the scope of this invention.

An alternate embodiment of the present invention would provide electrical power to the lights by means of a battery connected to the two wires instead of connecting the wires to the vehicle's electrical system. In this manner, if the vehicle's battery is dead, or a fuse is blown, the lights can still be operated to warn of the hazard.

One preferred method for releasably holding, at least a portion of rear side 16 of planar member 12 to the vehicle includes a magnetic strip 44 attached to rear side 16 of planar member 12.

An alternate preferred embodiment for releasably holding, at least a portion of rear side 16 of planar member 12 to the vehicle includes attaching an adhesive strip 45 in lieu of magnetic strip 44 to rear side 16 of planar member 12.

Another alternate embodiment for releasably holding, at least a portion of rear side 16 of planar member 12 to the vehicle includes a hook and pile combination 47 where one of the two is attached to the rear side 16 of planar member 12 and the other is attached to the vehicle in a position selected for display of the warning sign when the two component parts are mated.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. A road hazard warning device comprising:
   a generally triangular planar member having a front side and a rear side, said planar member being fabricated from a flexible sheet capable of being rolled or folded into a smaller size for storage;
   a light reflective coating applied to said front side of said planar member;
   a plurality of lights attached adjacent the outer peripheral edges of said generally triangular, planar member by being adhered to the surface of said planar member;
   means, connected to said plurality of lights for supplying electrical power to said plurality of lights; and,
   means, attached to said rear side of said planar members, for releasably holding, at least a portion of said rear side of said planar member to a vehicle.

2. The road hazard warning device as in claim 1 wherein said means for supplying electrical power to said plurality of lights comprises:
   at least one wire having at a first end an electrical connection to each light in said plurality of lights and at a second end having an allegator clip with tensioned opposed jaw members biased to remain in a closed position, each of said jaw members further having a plurality of depending teeth adapted for penetrating the insulation surrounding a wire in the vehicle electrical system and creating an electrical connection therewith for providing electrical power to said plurality of lights.

3. The road hazard warning device as in claim 2 wherein said means for supplying electrical power to said plurality of lights comprises two wires.

4. The road hazard warning device as in claim 3 wherein said two wires are electrically connected to said plurality of lights in parallel.

5. The road hazard warning device as in claim 3 wherein said two wires are eletrically connected to said plurality of lights in series.

6. The road hazard warning device as in claim 1 wherein said means for supplying electrical power to said plurality of lights comprises:
   at least one wire having at a first end an electrical connection to each light in said plurality of lights and at a second end an electrical to a battery.

7. The road hazard warning device as in claim 1 wherein said means, attached to said rear side of said planar member, for releasably holding, at least a portion of said rear side of said planar member to the vehicle comprises a magnetic strip attached to said rear side of said planar member.

8. The road hazard warning device as in claim 1 wherein said means, attached to said rear side of said planar member, for releasably holding, at least a portion of said rear side of said planar member to the vehicle comprises an adhesive strip attached to said rear side of said planar member. electrical system of a vehicle, comprising:

9. The road hazard warning device as in claim 1 further including means, attached to said plurality of lights, for flashing said plurality of lights.

10. The road hazard warning device as in claim 1 wherein said means, attached to said rear side of said planar member, for releasably holding, at least a portion of said rear side of said planar member to the vehicle comprises a hook and pile combination where one of said combination is attached to said rear side of said planar member and one of said combination is attached to a portion of the vehicle for releasably holding said planar member to the vehicle.

11. The road hazard warning device as in claim 1 wherein a weight is attached to one side of said triangular, planar member to cause said triangular planar member to hang generally perpendicular when attached to the vehicle.

12. The road hazard warning device as in claim 1 wherein said plurality of lights are arranged on said planar member to represent a message.

13. A road hazard warning device for use with an electrical system of a vehicle, comprising:
   a generally triangular, planar member having a front side and a rear side and being fabricated from a flexible sheet capable of being rolled or folded into a smaller size for storage, a weight being attached to one side of said generally triangular, planar member to cause said triangular planar member to hang generally perpendicular when attached to the vehicle;
   a light reflective coating applied to said front side of said planar member;
   a plurality of lights attached adjacent the outer peripheral edges of said generally triangular, planar member by being adhered to the surface of said planar member;
   means, attached to said plurality of lights, for flashing said plurality of lights;

means, connected to said plurality of lights for supplying electrical power from the electrical system of the vehicle to said plurality of lights; and, a first and second wire, each having at a first end an electrical connection to each light and in said plurality of lights and at a second end having an allegator clip with tensioned opposed jaw members biased to remain in a closed position, each of said jaw members further having a plurality of depending teeth adapted for penetrating the insulation surrounding a wire in the vehicle electrical system and creating an electrical connection therewith for providing electrical power to said plurality of lights.

14. The road hazard warning device as in claim 13 wherein said means, attached to said rear side of said planar member, for releasably holding, at least a portion of said rear side of said planar member to the vehicle comprises a magnetic strip attached to said rear side of said planar member.

15. The road hazard warning device as in claim 13 wherein said means, attached to said rear side of said planar member, for releasably holding, at least a portion of said rear side of said planar member to the vehicle comprises an adhesive strip attached to said rear side of said planar member.

16. The road hazard warning device as in claim 13 wherein said means, attached to said rear side of said planar member, for releasably holding, at least a portion of said rear side of said planar member to the vehicle comprises a hook and pile combination where one of said combination is attached to said rear side of said planar member and one of said combination is attached to a portion of the vehicle for releasably holding said planar member to the vehicle.

17. The road hazard warning device as in claim 13 wherein said plurality of lights are arranged on said planar member to represent a message.

* * * * *